US009588000B2

(12) United States Patent
Itou

(10) Patent No.: US 9,588,000 B2
(45) Date of Patent: Mar. 7, 2017

(54) PRESSURE SENSOR AND METHOD FOR MANUFACTURING SAME

(71) Applicant: DENSO CORPORATION, Kariya, Aichi-pref. (JP)

(72) Inventor: Masamichi Itou, Nagoya (JP)

(73) Assignee: DENSO CORPORATION, Kariya (JP)

( * ) Notice: Subject to any disclaimer, the term of this patent is extended or adjusted under 35 U.S.C. 154(b) by 143 days.

(21) Appl. No.: 14/436,957

(22) PCT Filed: Dec. 12, 2013

(86) PCT No.: PCT/JP2013/007303
§ 371 (c)(1),
(2) Date: Apr. 20, 2015

(87) PCT Pub. No.: WO2014/097585
PCT Pub. Date: Jun. 26, 2014

(65) Prior Publication Data
US 2015/0247772 A1   Sep. 3, 2015

(30) Foreign Application Priority Data

Dec. 18, 2012   (JP) .................................. 2012-276032

(51) Int. Cl.
*G01L 9/00*   (2006.01)
*G01L 19/00*   (2006.01)
(Continued)

(52) U.S. Cl.
CPC ............ *G01L 9/0051* (2013.01); *G01L 13/06* (2013.01); *G01L 19/0038* (2013.01);
(Continued)

(58) Field of Classification Search
CPC ... G01L 9/0051; G01L 13/06; G01L 19/0654; G01L 19/0038; Y10T 29/48002; B29L 2031/712; B29C 45/33
See application file for complete search history.

(56) References Cited

U.S. PATENT DOCUMENTS

| 8,276,455 B2 * | 10/2012 | Watanabe ............. G01L 19/141 |
| | | 73/700 |
| 2009/0007883 A1 | 1/2009 | Kazuhiro et al. |

(Continued)

FOREIGN PATENT DOCUMENTS

| JP | S57-138037 U | 8/1982 |
| JP | S58-066034 A | 4/1983 |

(Continued)

OTHER PUBLICATIONS

International Search Report and Written Opinion of the International Searching Authority mailed Jan. 14, 2014 for the corresponding international application No. PCT/JP2013/007303 (and English translation).

*Primary Examiner* — Francis Gray
(74) *Attorney, Agent, or Firm* — Posz Law Group, PLC

(57) ABSTRACT

A pressure introduction hole of a case has a first introduction hole extended in a predetermined direction to define a first end opening and a second introduction hole extended in a direction different from the predetermined direction to define a second end opening opposite from the first end opening. The second introduction hole is communicated to the first introduction hole. An angle defined between a wall surface of the first introduction hole and located adjacent to the second end opening and a wall surface of the second introduction hole and connected to the wall surface of the first introduction hole is larger than or equal to 90°. The second introduction hole has a communication part communicating with the first introduction hole, and a space increas- (Continued)

ing chamber further extending from the communication part away from the second end opening.

6 Claims, 6 Drawing Sheets

(51) Int. Cl.
  *G01L 19/06* (2006.01)
  *G01L 13/06* (2006.01)
  *B29C 45/33* (2006.01)
  *B29L 31/00* (2006.01)

(52) U.S. Cl.
  CPC .......... *G01L 19/0654* (2013.01); *B29C 45/33* (2013.01); *B29L 2031/712* (2013.01); *Y10T 29/49002* (2015.01)

(56) References Cited

U.S. PATENT DOCUMENTS

| | | | |
|---|---|---|---|
| 2009/0038399 A1 | | 2/2009 | Watanabe |
| 2015/0247774 A1* | | 9/2015 | Wagner ..................... G01F 1/34 |
| | | | 324/691 |
| 2015/0247776 A1* | | 9/2015 | Wagner ................. G01L 13/025 |
| | | | 73/431 |

FOREIGN PATENT DOCUMENTS

| JP | S61-143040 U | | 9/1986 |
|---|---|---|---|
| JP | H03-200035 A | | 9/1991 |
| JP | 11014486 A | * | 1/1999 |
| JP | H11-014486 A | | 1/1999 |
| JP | 2010256186 A | * | 11/2010 |
| JP | 2013-003112 A | | 1/2013 |

\* cited by examiner

PRESSURE SENSOR AND METHOD FOR MANUFACTURING SAME

CROSS REFERENCE TO RELATED APPLICATIONS

This application is a U.S. national stage of International Application No. PCT/JP2013/007303 filed on Dec. 12, 2013 and is based on Japanese Patent Application No. 2012-276032 filed on Dec. 18, 2012, the disclosures of which are incorporated herein by reference.

TECHNICAL FIELD

The present disclosure relates to a pressure sensor in which a sensor chip is arranged in a case having a pressure introduction hole, and a method of manufacturing the pressure sensor.

BACKGROUND ART

Patent Literature 1 suggests a pressure sensor in which a pressure introduction hole is formed to pass through a case, and a sensor chip is arranged in the case to output a sensor signal according to a measurement medium.

Specifically, in such a pressure sensor, the pressure introduction hole is constructed by a first introduction hole extended in a predetermined direction and a second introduction hole extended in a direction perpendicular to the extending direction of the first introduction hole and communicated to the first introduction hole. That is, the pressure introduction hole has what is called L-shape. The sensor chip is arranged to close the first end opening of the first introduction hole opposite from the side where the first introduction hole is communicated to the second introduction hole.

Such a pressure sensor is attached and used for a component to be attached so that the second introduction hole of the pressure introduction hole is parallel to the vertical direction and that the other end opening of the pressure introduction hole opposite from the first end opening (opening of the second introduction hole opposite from the side where the second introduction hole is communicated to the first introduction hole) is located on the ground side. A sensor signal according to the measurement medium introduced into the pressure introduction hole is outputted from the sensor chip.

Accordingly, a water drop existing especially in the second introduction hole is drained by gravity, such that the pressure introduction hole is restricted from being closed.

PRIOR ART LITERATURES

Patent Literature

Patent Literature 1: JP 2009-42056A

SUMMARY OF INVENTION

In recent years, there is a request for further restricting a water drop from staying in a pressure introduction hole. That is, there is a request to further improve the drain property of pressure introduction hole.

The present disclosure is aimed to provide a pressure sensor in which the drain property of pressure introduction hole is further improved, and a method of manufacturing the pressure sensor.

According to an aspect of the present disclosure, a pressure sensor includes a case and a sensor chip which outputs a sensor signal according to measurement medium. The case has a pressure introduction hole passing through the case to introduce measurement medium. The sensor chip is disposed to close a first end opening of the pressure introduction hole.

The pressure introduction hole has a first introduction hole extended in a predetermined direction to define the first end opening, and a second introduction hole extended in a direction different from the predetermined direction to define a second end opening that is located opposite from the first end opening. The second introduction hole is communicated to the first introduction hole. An angle defined between a wall surface of the first introduction hole and located adjacent to the second end opening and a wall surface of the second introduction hole and connected to the wall surface of the first introduction hole is larger than or equal to 90°. The second introduction hole has a communication part communicating with the first introduction hole between the second end opening and an end portion opposite from the second end opening, and a space increasing chamber further extending from the communication part away from the second end opening.

Such a pressure sensor is attached and used for a component to be attached so that the second introduction hole of the pressure introduction hole becomes parallel to the vertical direction and that the second end opening is located on the ground side. Due to the space increasing chamber, as compared with a conventional pressure sensor, the length of the second introduction hole becomes long in the direction away from the second end opening. For this reason, when pulsation arises in pressure, if water drop exists in the second introduction hole, the water drop is displaced inside the second introduction hole. When the water drop reaches the second end opening after arriving at the end portion, the force of inertia applied to the water drop becomes large. Therefore, compared with the conventional pressure sensor, water drop can be easily discharged from the second end opening, such that the drainage property of the pressure introduction hole can be improved.

A method of manufacturing the pressure sensor includes: preparing a mold having an upper die and a lower die combined to define a cavity inside, a first slide die capable to slide inside of the cavity to form the first introduction hole, and a second slide die capable to slide inside of the cavity to form the second introduction hole; tightly contacting a tip end of the first slide die projected in the cavity onto the second slide die between a tip end of the second slide die projected in the cavity and a portion of the second slide die opposite from the tip end of the second slide die; forming the case by injecting resin into the cavity to form the first introduction hole with the first slide die and the second introduction hole with the second slide die; and mounting the sensor chip to the case to close the first end opening of the pressure introduction hole.

DESCRIPTION OF EMBODIMENTS

Hereafter, embodiments are described based on drawings. In addition, portions same or mutually equal in the embodiments are explained by giving the same reference code.

First Embodiment

A first embodiment is described. A pressure sensor of this embodiment is attached to, for example, an exhaust pipe of a diesel engine to detect pressure loss of a diesel particulate filter (DPF) prepared in the exhaust pipe. The pressure sensor is used as a difference pressure detection type pressure sensor which detects a difference pressure between the upstream side pressure of the DPF and the downstream side pressure of the DPF.

Figure 1:
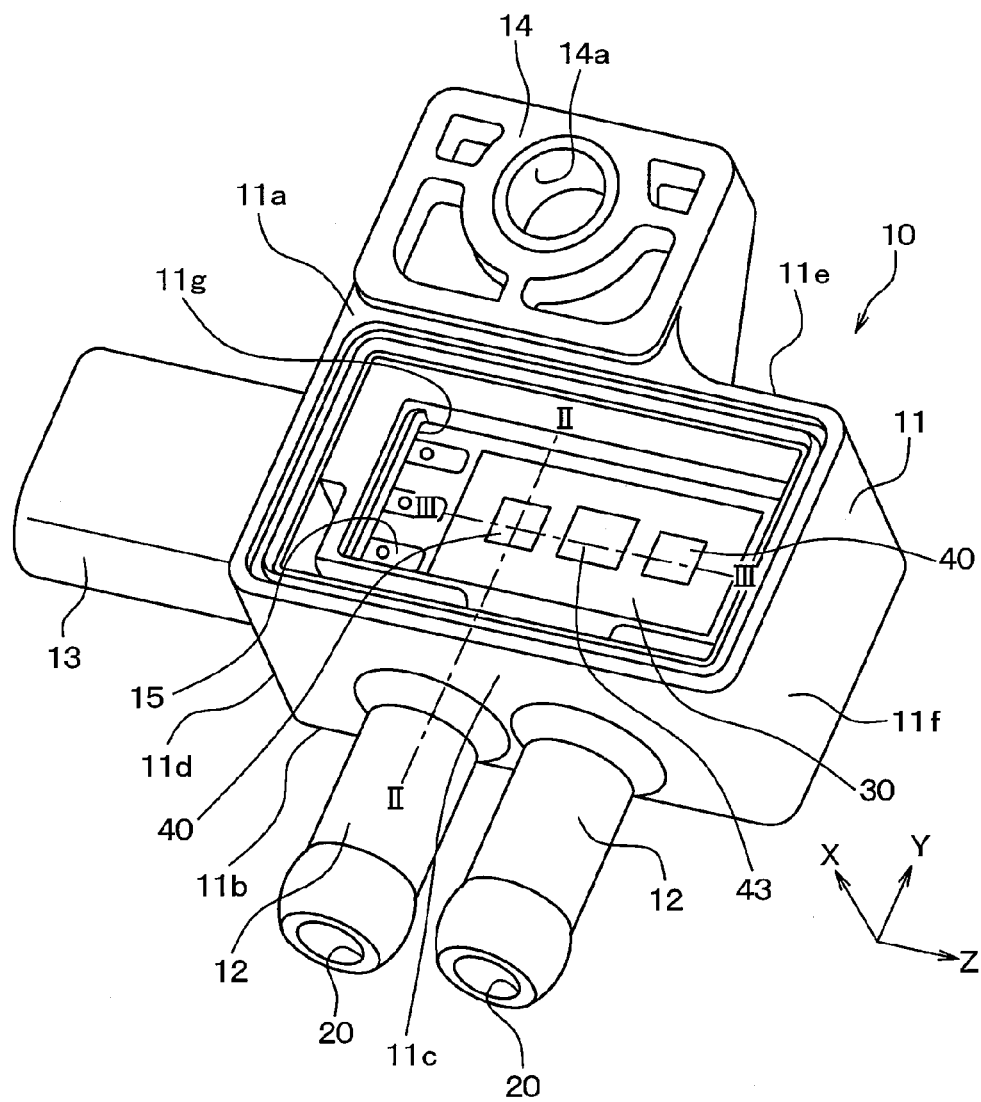
FIG. 1 is a perspective view illustrating a pressure sensor according to a first embodiment.

As shown in FIG. 1, the pressure sensor of this embodiment includes a case 10 produced by molding polyphenylene sulfide (PPS), polybutylene terephthalate (PBT) or epoxy resin, with a mold.

The case 10 has a main part 11, a port part 12, a connector part 13 and an attachment part 14. The main part 11 has an approximately rectangular parallelepiped shape with a first surface 11a, a second surface 11b and first to fourth side surfaces 11c-11f which connect the first surface 11a to the second surface 11b. Two of the port parts 12 are provided on the first side surface 11c, and extend in the direction of the normal to the first side surface 11c. The connector part 13 is provided on the second side surface 11d. The attachment part 14 is provided to the third side surface 11e.

Figure 2:
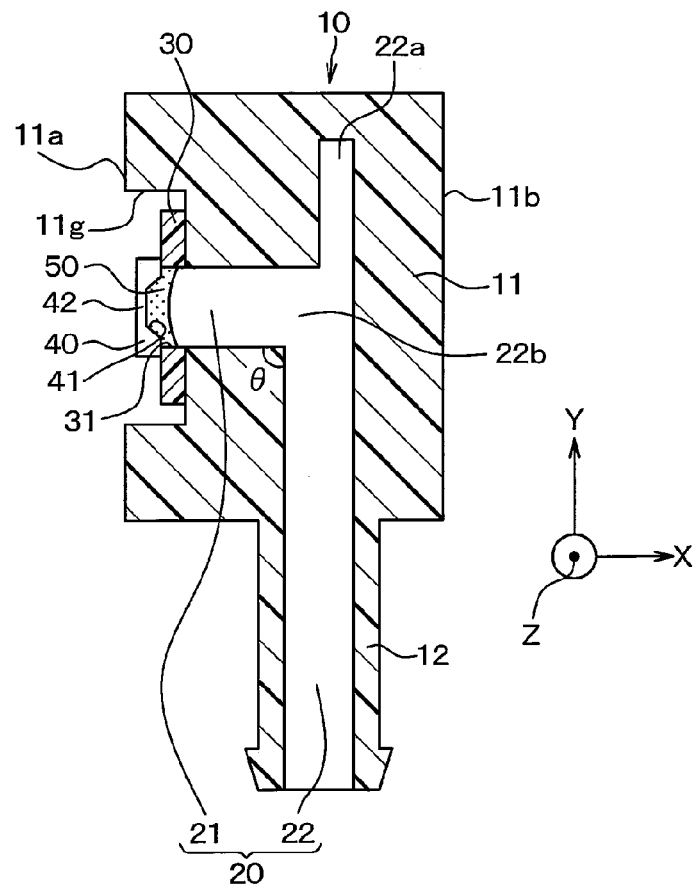
FIG. 2 is a schematic sectional view along a line II-II in FIG. 1.
Figure 3:
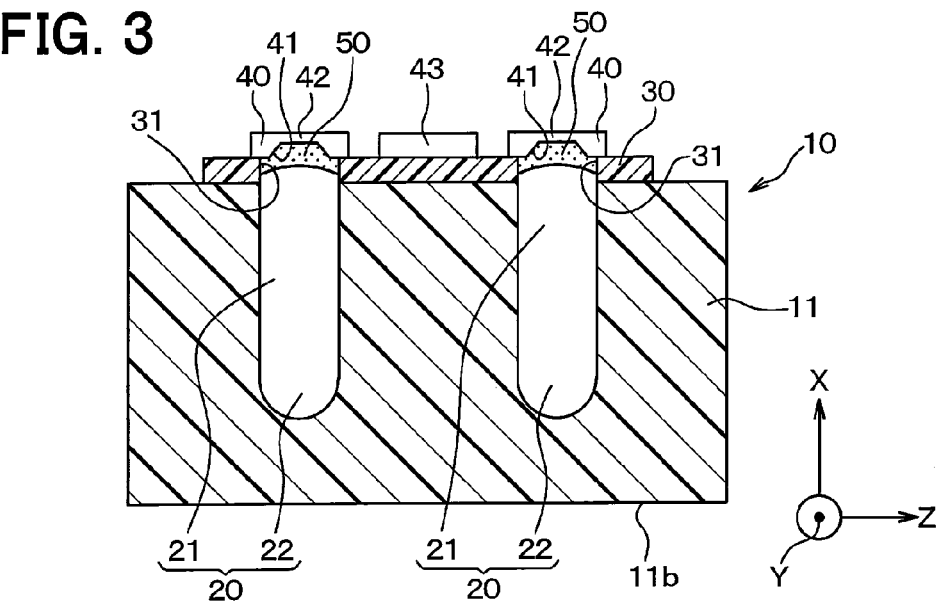
FIG. 3 is a schematic sectional view along a line in FIG. 1.

As shown in FIG. 2 and FIG. 3, the case 10 has a pressure introduction hole 20 into which measurement medium is introduced. The pressure introduction hole 20 has a first introduction hole 21 defined in the main part 11, and a second introduction hole 22 defined in the main part 11 and the port part 12.

The shape of the pressure introduction hole 20 of this embodiment is explained. The direction of the normal to the first surface 11a (the second surface 11b) is defined as a direction of X. The direction of the normal to the first side surface 11c (the third side surface 11e) is defined as a direction of Y. The direction of the normal to the second side surface 11d (the fourth side surface 11f) is defined as a direction of Z.

The first introduction hole 21 is formed to extend from a bottom surface of a recess portion 11g defined in the first surface 11a of the main part 11 toward the second surface 11b. In this embodiment, the first introduction hole 21 is extended in a direction parallel to the direction of X. The second introduction hole 22 is formed to pass through the port part 12 and the main part 11 along the extending direction (the direction of Y) of the port part 12.

The second introduction hole 22 has an opening at the tip end in the projection direction of the port part 12, and a communication part 22b communicating with the first introduction hole 21 at a portion between the opening and an end portion opposite from the opening. Thereby, the pressure introduction hole 20 is formed in the case 10 to pass through the main part 11 and the port part 12.

The second introduction hole 22 is configured to have a space increasing chamber 22a at a portion opposite from the port part 12 through the communication part 22b. The space increasing chamber 22a increases the length of the second introduction hole 22 between the opening at the tip end of the port part 12 in the projection direction and the end portion opposite from the opening, and is not for introducing measurement medium.

Moreover, an angle θ between a wall surface of the first introduction hole 21 located adjacent to the port part 12 and a wall surface of the second introduction hole 22 connected with the wall surface of the first introduction hole 21 is set as 90°. That is, the pressure introduction hole 20 of this embodiment is formed into an approximately T-shape.

In this embodiment, in the pressure introduction hole 20, the opening formed in the first surface 11a corresponds to a first opening, and the opening at the tip end in the projection direction of the port part 12 corresponds to a second opening. The first introduction hole 21 and the second introduction hole 22 are formed so that the center axes cross with each other.

As shown in FIGS. 1 to 3, a sensor board 30 is arranged in the recess portion 11g of the main part 11 through an adhesive not illustrated. The sensor board 30 is, for example, a printed circuit board. Plural pads which are not illustrated are formed on the surface of the sensor board 30 (opposite from the case 10 through the sensor board 30), and a sensor chip 40 and a circuit chip 43 are mounted on the sensor board 30. Moreover, two penetration holes 31 are defined in the sensor board 30 to respectively communicate to the pressure introduction holes 20.

The sensor chip 40 is made of a rectangle board shaped silicon substrate, and has a thin diaphragm 42 by forming a concave portion 41 on the back surface. A gauge resistor which is not illustrated is formed in the diaphragm 42 to construct a bridged circuit. That is, in the sensor chip 40 of this embodiment, when a pressure is applied to the diaphragm 42, the resistance value of the gauge resistor changes, and the voltage of the bridged circuit changes. The sensor chip 40 is a semiconductor diaphragm type which outputs a sensor signal according to the change in the voltage.

The sensor chip 40 is disposed to the sensor board 30 from the back surface to close the respective penetration hole 31 of the sensor board 30 through an adhesive which is not illustrated. Thereby, measurement medium introduced into the pressure introduction hole 20 from the opening at the tip end of the port part 12 in the projection direction is applied to the sensor chip 40.

The circuit chip 43 has a control circuit that outputs a drive signal to each of sensor chips 40 and that outputs a detection signal to the exterior. A sensor signal is inputted from the sensor chip 40 into the control circuit, and the control circuit amplifies the sensor signal and performs calculation to output into an external circuit. The control circuit is disposed in a portion of the sensor board 30 different from the sensor chip 40 through an adhesive which is not illustrated.

Moreover, the pads formed on the sensor chip 40, the circuit chip 43, and the sensor board 30 are electrically connected suitably through a bonding wire, which is not illustrated, made of gold or aluminum.

A protection component 50 in gel state is arranged at each penetration hole 31 of the sensor board 30 and the concave portion 41 of the sensor chip 40. The protection component 50 protects the penetration hole 31 (sensor board 30) and the diaphragm 42 (sensor chip 40) from corrosion gas or humidity contained in measurement medium. That is, in this embodiment, the pressure of measurement medium is impressed to the diaphragm 42 through the protection component 50.

The protection component 50 is made of, for example, fluoride gel, silicone gel, or fluoro-silicone gel. When measuring pressure of exhaust gas as measurement medium, water condensed by exhaust gas has strong acidity, since nitrogen oxide and sulfide oxide contained in exhaust gas are melt therein. It is desirable to use fluoride gel having high acid resistance as the protection component 50.

As shown in FIG. 1, the case 10 has plural terminals 15 made of metal. Each of the terminals 15 is held in the case 10 by being molded integrally with the case 10 by insertion molding.

Specifically, each terminal 15 is held to pass through the case 10. An end part of the terminal 15 is projected into the recess portion 11g, and the other end part is projected into the connector part 13. The end part of each terminal 15 projected in the recess portion 11g is electrically connected with the circuit chip 43 through the bonding wire which is not illustrated. Moreover, the connector part 13 has a cylindrical shape extended in the direction of the normal to the second side surface 11d (the direction of Y), and is hollow inside. For this reason, the other end part of each terminal 15 projected in the connector part 13 is exposed in the connector part 13 and is electrically connected with an external wiring component.

The attachment part 14 has a fix hole 14a passing through in the direction of the normal to the first surface 11a (the direction of X). When the attachment part 14 is attached to a component to be attached, a screw component such as bolt is inserted into the fix hole 14a. The fix hole 14a is made of a metal ring fitted into a wall surface of a penetration hole defined in resin component of the attachment part 14.

The method of manufacturing the pressure sensor is explained. First, a mold for manufacturing the case 10 having the pressure introduction hole 20 is explained referring to FIG. 4.

Figure 4:
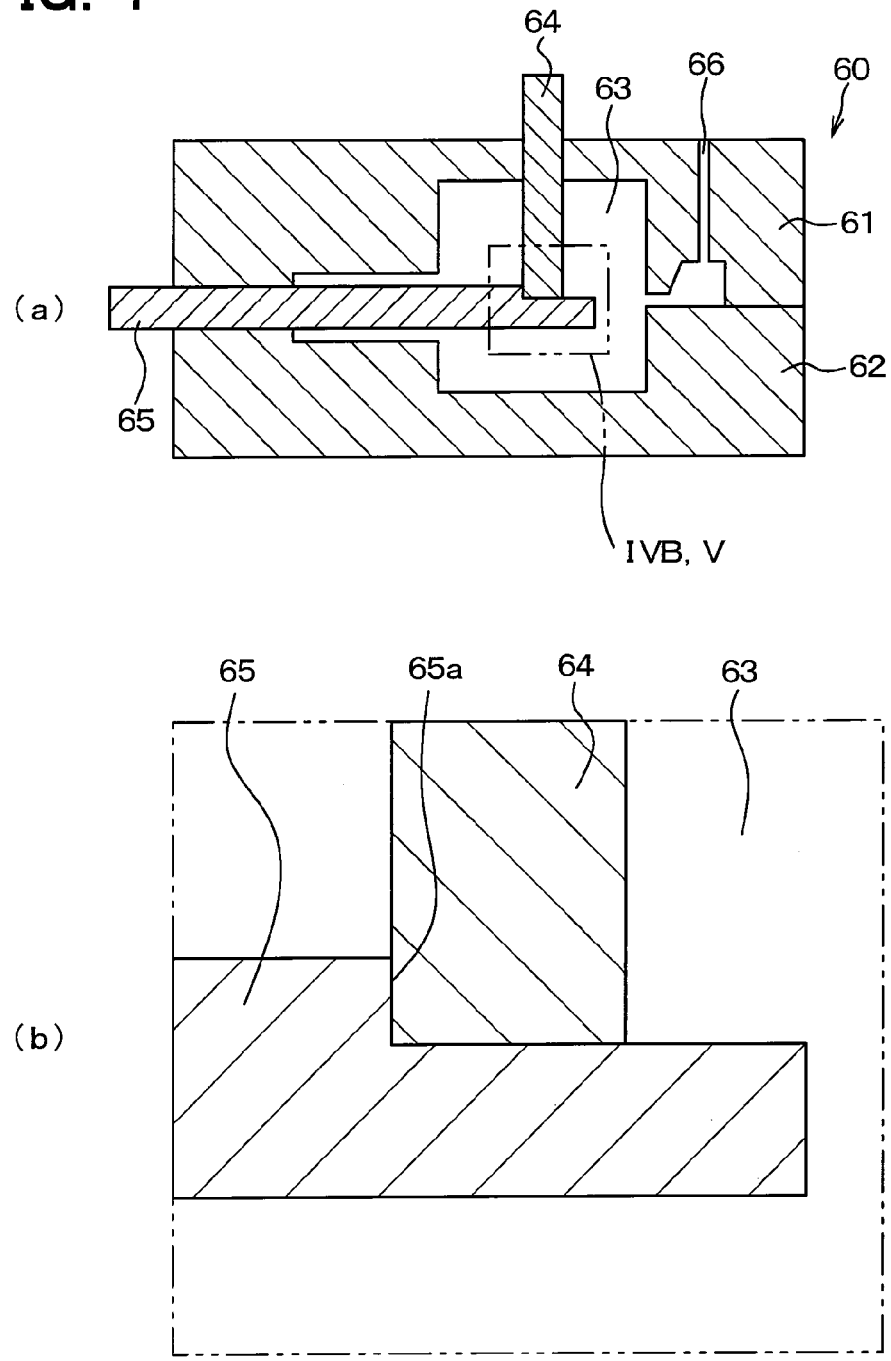
FIG. 4(a) is a schematic cross-sectional view illustrating a mold used for manufacturing a case shown in FIG. 1.
FIG. 4(b) is an enlarged view of a double chain line portion IVB in FIG. 4(a).

As shown in FIG. 4, the mold 60 of this embodiment includes an upper die 61, a lower die 62, a first slide die 64, and a second slide die 65. The upper die 61 and the lower die 62 form the outer shape of the case 10. A cavity 63 is defined between the upper die 61 and the lower die 62 combined with each other. The first slide die 64 and the second slide die 65 can slide (move) inside of the cavity 63.

The first slide die 64 slides inside of the upper die 61 by a pin, which is not illustrated, of the mold 60, and forms the first introduction hole 21 when resin is poured into the cavity 63.

The second slide die 65 slides between the upper die 61 and the lower die 62 by a pin, which is not illustrated, of the mold 60, and forms the second introduction hole 22 when resin is poured into the cavity 63. In this embodiment, the second slide die 65 has a recess portion 65a opposing the upper die 61 at the tip end opposite from the position where the second slide die 65 is supported between the upper die 61 and the lower die 62. That is, the thickness of the second slide die 65 is made thinner at the tip end than the position where the second slide die 65 is supported between the upper die 61 and the lower die 62.

Moreover, the upper die 61 has a gate 66 as a supply passage supplying resin poured into the cavity 63. A knock out pin not illustrated is formed in the lower die 62 to remove the case 10 from the mold after fabricating the case 10.

The case 10 is manufactured by pouring and hardening resin in the mold 60. Specifically, the terminal 15 is interposed between the upper die 61 and the lower die 62 to be held in the cavity 63.

The first slide die 64 is slid such that the tip end of the first slide die 64 is projected into the cavity 63, and the second slide die 65 is slid such that the tip end of the second slide die 65 is projected into the cavity 63. At this time, as shown in FIG. 4(b), the tip end surface of the first slide die 64 is made in tightly contact with the bottom surface and the side surface of the recess portion 65 of the second slide die 65, such that the tip end portion of the second slide die 65 opposite from the position where supported between the upper die 61 and the lower die 62 can be projected from the first slide die 64.

Then, after the temperature of the mold 60 is raised to a point suitable for the hardening reaction of resin, a nozzle part of an ejection unit not illustrated is made in contact with the upper side of the gate 66, and liquefied resin is ejected from the gate 66 into the mold 60 to fill the cavity 63 with resin. Thereby, resin filled in the cavity 63 is hardened to produce the case 10.

Figure 5:
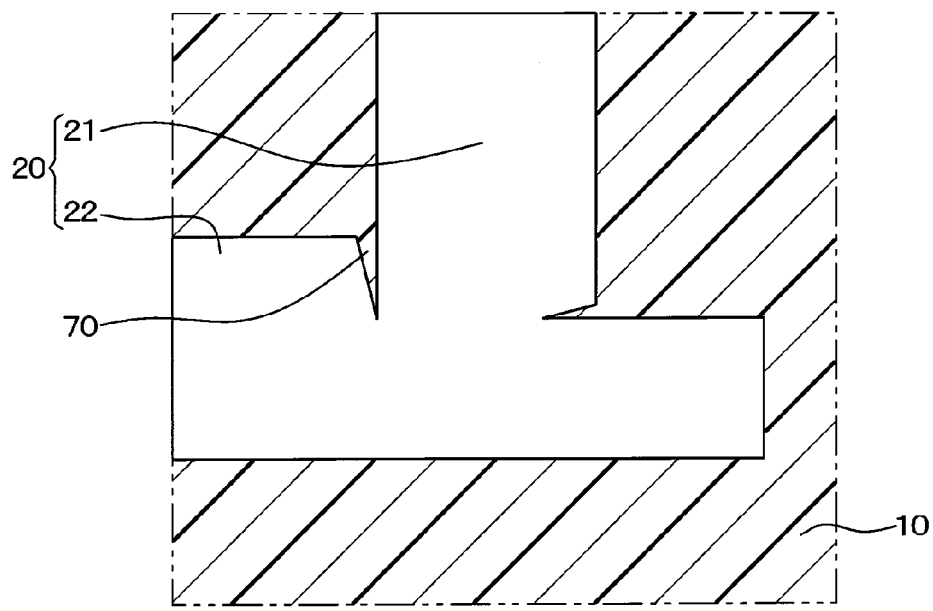
FIG. 5 is an enlarged view illustrating the case corresponding to the double chain line portion V in FIG. 4 when the case is manufactured using the mold shown in FIG. 4.

Burr may occur in the tightly contact portion between the first slide die 64 and the second slide die 65. In this embodiment, since the first slide die 64 and the second slide die 65 are in tight contact, as shown in FIG. 5, a burr 70 is formed between the wall surface of the first introduction hole 21 adjacent to the port part 12 and the wall surface of the second introduction hole 22 connected with the wall surface of the first introduction hole 21, and has a shape projected into the second introduction hole 22.

Next, the first and second slide dies 64 and 65 are slid and removed from the case 10. The upper die 61 and the lower die 62 are separated from the case 10 using the knock out pin equipped in the lower die 62.

After that, just to perform the same manufacturing processes as usual using the case 10. That is, the sensor board 30 having the penetration hole 31 is prepared first, and the sensor chip 40 is mounted to the sensor board 30 to close the penetration hole 31 and the circuit chip 43 is mounted. Next, the sensor chip 40 and the circuit chip 43 are electrically connected through a bonding wire, and the protection component 50 is arranged to the penetration hole 31 of the sensor board 30 and the concave portion 41 of the sensor chip 40.

The sensor board 30 is mounted to the recess portion 11g of the case 10, and the terminal 15 and the circuit chip 43 are electrically connected through a bonding wire, such that the pressure sensor is manufactured.

Operation of the pressure sensor of this embodiment is explained.

The pressure sensor of this embodiment is attached to the exhaust pipe of the diesel engine as a component to be attached by inserting a bolt in the fix hole 14a, so that the second introduction hole 22 of the pressure introduction hole 20 becomes parallel to the vertical direction and that the opening at the tip end in the projection direction of the port part 12 is located on the ground side.

Exhaust gas upstream of the DPF is introduced into one pressure introduction hole 20, and exhaust gas downstream of the DPF is introduced into the other pressure introduction hole 20. Thereby, the upstream side pressure is detected with one sensor chip 40, and the downstream side pressure is detected with the other sensor chip 40. The circuit chip 43 calculates the difference between the upstream side pressure and the downstream side pressure, and the calculation result is outputted to an external circuit through the terminal 15. Thereby, the difference pressure in the exhaust pipe between before and after the DPF is detected from the calculation result.

As explained above, in this embodiment, the pressure sensor is attached to a component to be attached (for example, exhaust pipe of diesel engine) so that the second introduction hole 22 of the pressure introduction hole 20 becomes parallel to the vertical direction and that the opening at the tip end in the projection direction of the port part 12 is located on the ground side. The pressure introduction hole 20 has the space increasing chamber 22a that is a portion of the second introduction hole 22 opposite from the port part 12 through the communication part 22b communicated to the first introduction hole 21.

Figure 6:
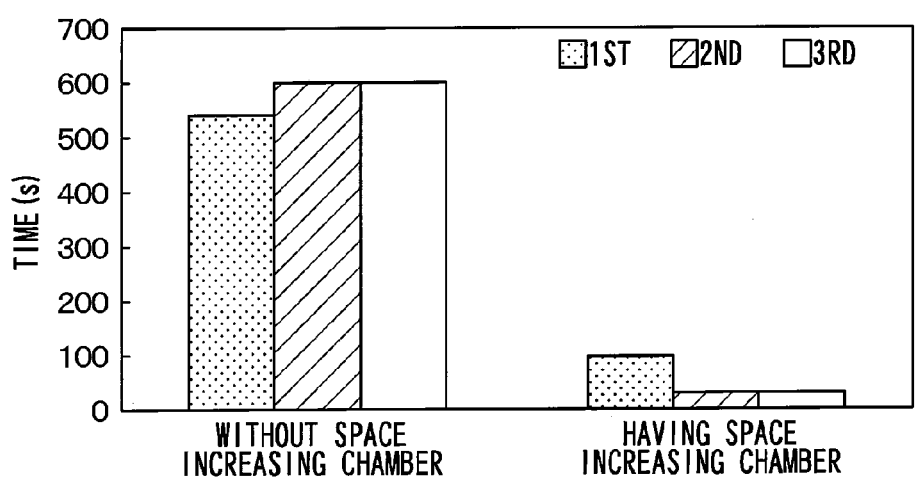
FIG. 6 is a graph illustrating experimental results in which time period taken for discharging liquid from a pressure introduction hole is measured when vibration is impressed in a direction of Y after liquid having a volume that is half of a volume of the pressure introduction hole is poured into the pressure introduction hole.

For this reason, as shown in FIG. 6, when a time period taken for discharging liquid from the pressure introduction hole 20 is measured after liquid with a volume that is half of the volume of the pressure introduction hole 20 is poured into the pressure introduction hole 20 and vibration is impressed in the direction of Y, the draining property can be raised by the space increasing chamber 22a, compared with a case where there is no space increasing chamber 22a. This is based on the following reasons.

That is, compared with a conventional pressure sensor, the space increasing chamber 22a increases the distance between the opening at the tip end of the port part 12 in the projection direction and the end portion opposite from the opening. For this reason, while a water drop existing in the second introduction hole 22 will be displaced inside of the second introduction hole 22 when pulsation arises in pressure, the force of inertia applied to the water drop becomes large when reaching the opening at the tip end of the port part 12 in the projection direction after the water drop arrives at the end portion. Therefore, compared with a conventional pressure sensor, the water drop can be easily discharged from the opening at the tip end of the port part 12 in the projection direction, such that the drainage property of the pressure introduction hole 20 can be raised.

FIG. 6 presents the experimental results, in which 1ST represents experimental results by setting the frequency of vibration impressed in the vertical direction (the direction of Y) as 10 Hz, 2ND represents experimental results by setting the frequency of vibration impressed in the vertical direction (the direction of Y) as 300 Hz, and 3RD represents experimental results by setting the frequency of vibration impressed in the vertical direction (the direction of Y) as 1000 Hz. Moreover, in the 2ND and the 3RD of the case without the space increasing chamber 22a, the experiment is finished with elapse of 600 seconds because the liquid in the pressure introduction hole 20 cannot be drained by continuing impressing vibration for 600 seconds.

Second Embodiment

A second embodiment is described, in which the shape of the second introduction hole 22 is modified relative to the first embodiment, and the other portions are the same as the first embodiment, so the explanation is omitted here.

Figure 7:
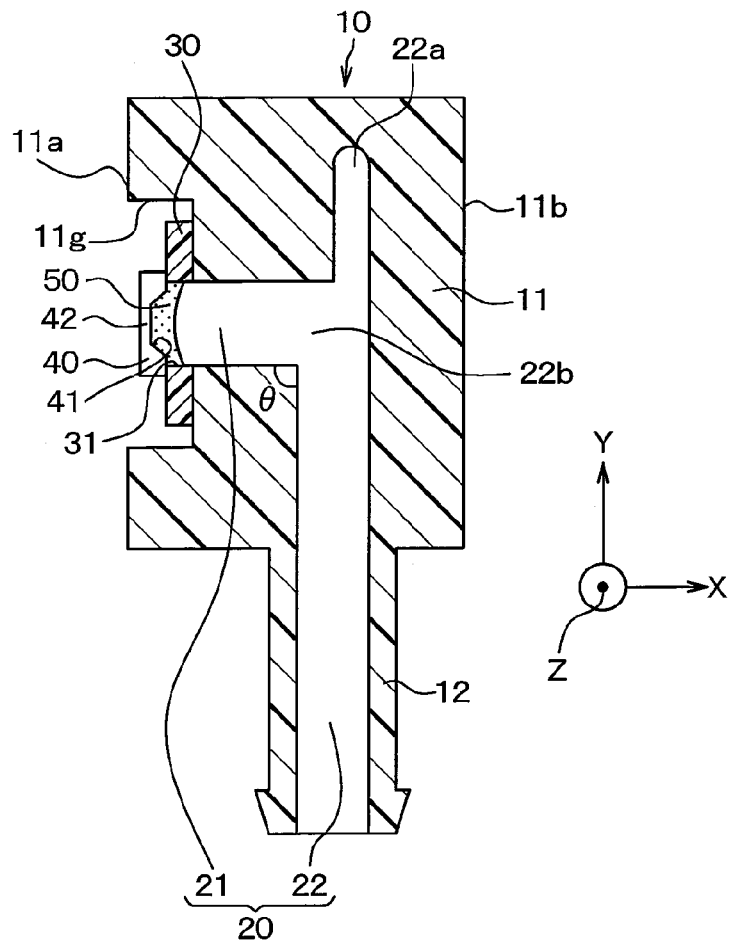
FIG. 7 is a schematic sectional view illustrating a pressure sensor according to a second embodiment.

As shown in FIG. 7, in this embodiment, the corner part of the wall surface defining the space increasing chamber 22a is rounded. In other words, the angled part of the space increasing chamber 22a in the second introduction hole 22 opposite from the communication part 22b is rounded to have a shape with a curvature. In addition, FIG. 7 is a schematic sectional view corresponding to the line II-II in FIG. 1.

Accordingly, the contact area between the water drop and the wall surface becomes small at the corner part of the wall surface, such that the drainage property can be further raised, because the surface tension generated becomes small.

Third Embodiment

A third embodiment is described, in which the shape of the first introduction hole 21 is modified relative to the first embodiment, and the other portions are the same as the first embodiment, so the explanation is omitted here.

Figure 8:
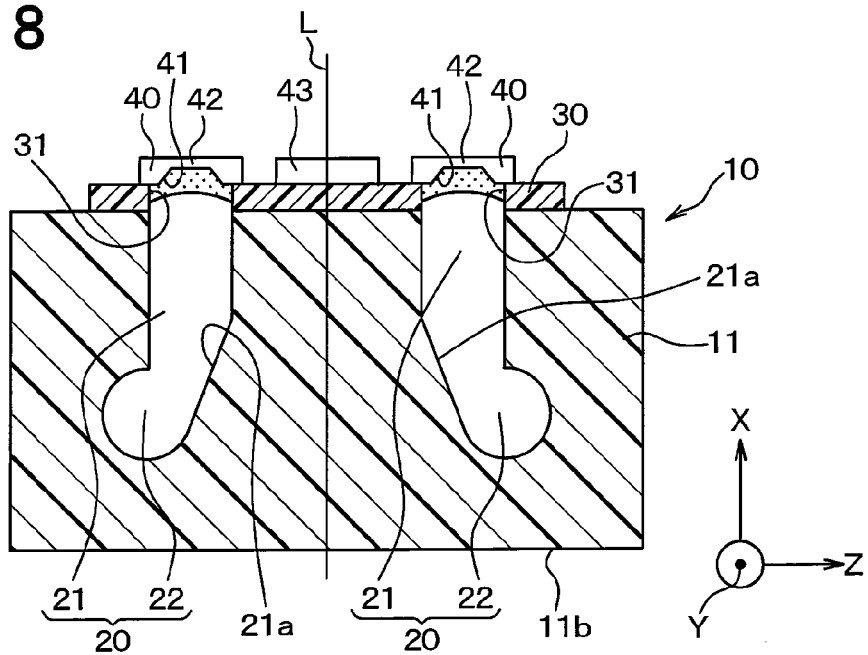
FIG. 8 is a schematic sectional view illustrating a pressure sensor according to a third embodiment.

As shown in FIG. 8, in this embodiment, the center axis passing through the center of the first introduction hole 21 and the center axis passing through the center of the second introduction hole 22 do not cross. Specifically, an axis L is defined to extend in the direction of the normal to the first surface 11a and to pass through the center of the circuit chip 43. The distance from the axis L to the second introduction hole 22 in the direction of Z is set longer than the distance from the axis L to the first introduction hole 21 in the direction of Z. Of the wall surface defining the first introduction hole 21, an opposite wall surface (wall surface adjacent to the axis L) opposite from a wall surface located adjacent to the second introduction hole 22 has an inclination part 21a that is inclined to the second introduction hole 22 at a portion adjacent to the second introduction hole 22. In addition, FIG. 8 is a schematic sectional view corresponding to the line in FIG. 1.

Thus, the present disclosure may also be applied to a pressure sensor having a pressure introduction hole 20 in which the center axis passing through the center of the first introduction hole 21 and the center axis passing through the center of the second introduction hole 22 do not intersect. Moreover, of the wall surface defining the first introduction hole 21, a portion of the wall surface away from the second introduction hole 22 is inclined to the second introduction hole 22, at the portion adjacent to the second introduction hole 22. For this reason, a water drop staying in the first introduction hole 21 easily flows to the second introduction hole 22, when the pressure sensor is attached in the inclined state so that the first surface 11a is located on the upper side in the vertical direction and that the second surface 11b is located on the ground side.

In addition, it is described that the distance from the axis L to the second introduction hole 22 in the direction of Z is made longer than the distance to the first introduction hole 21 in this embodiment. Alternatively, the distance from the axis L to the second introduction hole 22 in the direction of Z may be made shorter than the distance to the first introduction hole 21.

Fourth Embodiment

A fourth embodiment is described, in which the shape of the first introduction hole 21 is modified relative to the first embodiment, and the other portions are the same as the first embodiment, so the explanation is omitted here.

Figure 9:
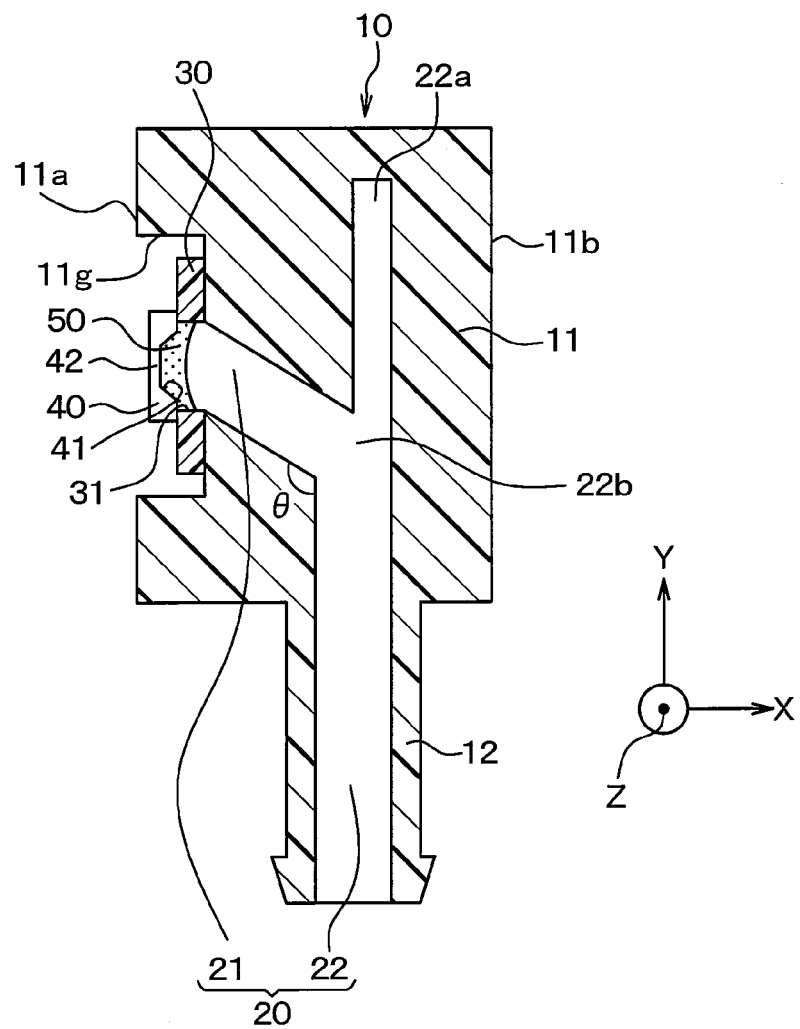
FIG. 9 is a schematic sectional view illustrating a pressure sensor according to a fourth embodiment.

As shown in FIG. 9, in this embodiment, the first introduction hole 21 is inclined toward the port part 12 (downward in FIG. 9) relative to the second introduction hole 22. In other words, the first introduction hole 21 extends toward the communication part 22b to be inclined toward the port part 12 relative to the second introduction hole 22. In addition, FIG. 9 is a schematic sectional view corresponding to the line II-II in FIG. 1.

Thus, water drop can be easily made to flow to the second introduction hole 22, when water drop stays in the first introduction hole 21.

Other Embodiment

While it is explained that two pressure introduction holes 20 are formed in the case 10 in the above embodiment, the number of the pressure introduction holes 20 formed in the case 10 may be only one.

The above-mentioned embodiments may be suitably combined with each other. For example, the fourth embodiment may be combined with the second or third embodiment, in which the first introduction hole 21 is inclined to the port part 12 as extending toward the second introduction hole 22. Moreover, the second embodiment may be combined with the third embodiment, in which the corner part of the wall surface defining the space increasing chamber 22a is rounded.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:
1. A pressure sensor comprising:
a case; and
a sensor chip that outputs a sensor signal corresponding to a measurement medium, wherein the case has a pressure introduction hole passing through the case to introduce the measurement medium, and the sensor chip is arranged to close a first end opening of the pressure introduction hole,
the pressure introduction hole has
  a first introduction hole extended in a predetermined direction to define the first end opening, and
  a second introduction hole extended in a direction different from the predetermined direction to define a second end opening located opposite from the first end opening, the second introduction hole being communicated to the first introduction hole,
an angle defined between a wall surface of the first introduction hole and located adjacent to the second end opening and a wall surface of the second introduction hole and connected to the wall surface of the first introduction hole is larger than or equal to 90°,
the second introduction hole has
  a communication part communicating with the first introduction hole between the second end opening and an end portion opposite from the second end opening, and
  a space increasing chamber further extending from the communication part away from the second end opening,
an axis passing through a center of the first introduction hole and extending in an extending direction of the first introduction hole and an axis passing through a center of the second introduction hole and extending in an extending direction of the second introduction hole do not cross with each other, and
a wall surface of the first introduction hole located opposite from the second introduction hole, at a portion opposite from the first end opening, has an inclination part that is inclined toward the second introduction hole.

2. The pressure sensor according to claim 1, wherein the space increasing chamber of the second introduction hole has a corner part opposite from the communication part and the corner part is rounded.

3. The pressure sensor according to claim 1, wherein the first introduction hole is inclined toward the second end opening as extending from the first end opening to the communication part of the second introduction hole.

4. The pressure sensor according to claim 1, wherein the case has two of the pressure introduction holes, and measurement mediums respectively introduced into the two of the pressure introduction holes are different from each other.

5. A method of manufacturing the pressure sensor according to claim 1, wherein
preparing a mold having an upper die and a lower die combined to define a cavity inside, a first slide die capable to slide inside of the cavity to form the first introduction hole, and a second slide die capable to slide inside of the cavity to form the second introduction hole;
tightly contacting a tip end of the first slide die projected in the cavity onto the second slide die between a tip end of the second slide die projected in the cavity and a portion of the second slide die opposite from the tip end of the second slide die;
forming the case by injecting resin into the cavity to form the first introduction hole by the first slide die and to form the second introduction hole by the second slide die; and
mounting the sensor chip to the case to close the first end opening of the pressure introduction hole.

6. The method of manufacturing the pressure sensor according to claim 5, wherein
in the preparing of the mold, the second slide die has a recess portion at the tip end projected in the cavity, and
in the tightly contacting, the tip end of the first slide die projected in the cavity is made in tightly contact with a bottom surface and a side surface of the recess portion.

* * * * *